United States Patent [19]

Weiner

[11] Patent Number: 4,778,391
[45] Date of Patent: Oct. 18, 1988

[54] SOUND-PRODUCING AMUSEMENT OR EDUCATIONAL DEVICES

[76] Inventor: Avish J. Weiner, 39 Yehuda Hanasi Street, Ramat-Aviv, Tel-Aviv, Israel

[21] Appl. No.: 116,842

[22] Filed: Nov. 5, 1987

Related U.S. Application Data

[62] Division of Ser. No. 003,040, Jan. 13, 1987.

[30] Foreign Application Priority Data

Jan. 26, 1986 [IL] Israel ................................ 77705
Jan. 2, 1987 [IL] Israel ................................ 81146

[51] Int. Cl.⁴ ........................................ G09F 27/00
[52] U.S. Cl. .................................... 434/317; 434/178
[58] Field of Search ............................. 434/178, 317

[56] References Cited

U.S. PATENT DOCUMENTS

| | | |
|---|---|---|
| 1,236,333 | 8/1917 | Mayhew . |
| 2,484,895 | 10/1949 | Links . |
| 2,546,680 | 3/1951 | Samuels . |
| 2,822,425 | 2/1958 | Hicks . |
| 3,086,297 | 4/1963 | Kantrowitz . |
| 3,220,126 | 11/1965 | Gabrielsen . |
| 3,352,027 | 11/1967 | Schwartz . |
| 3,529,832 | 9/1970 | Goetz et al. . |
| 3,738,021 | 6/1973 | Hino et al. . |
| 4,021,932 | 5/1977 | Lipps . |
| 4,579,533 | 4/1986 | Anderson et al. . |
| 4,636,881 | 1/1987 | Brefka et al. ...................... 434/317 |
| 4,696,653 | 9/1987 | McKeefery . |
| 4,703,573 | 11/1987 | Montgomery et al. ............. 434/317 |

*Primary Examiner*—Leo P. Picard
*Attorney, Agent, or Firm*—Benjamin J. Barish

[57] ABSTRACT

A sound-producing amusement or educational device, particularly a book, comprises a read-only memory having recorded therein digital data representing sounds characteristic of the amusement device, and a sound-producing unit for producing the sounds represented by the digital data recorded in the memory. The memory is in a separate unit attached to the book and includes connectors for connection to the sound-producing unit. The sound-producing unit is separate and distinct from the book and its memory unit, and includes mating connectors for removably attaching and electrically connecting the sound-producing unit to the memory unit, a battery for supplying power to both the sound-producing unit and the memory unit, and a speaker for producing the sounds represented by the data stored in the memory unit.

20 Claims, 2 Drawing Sheets

SOUND-PRODUCING AMUSEMENT OR EDUCATIONAL DEVICES

RELATED APPLICATION

The present application is a Division of my pending U.S. application Ser. No. 07/003,040 filed Jan. 13, 1987, relating to sound-producing amusement or education devices, such as talking books, talking toys, talking dolls, and the like. The invention of the present application is directed to a specific one of such amusement or educational devices, namely talking books.

BACKGROUND OF THE INVENTION

A number of sound-producing amusement devices have been developed. In the older devices, the sounds were prerecorded in analogue form, for example on a disc or tape; but in the newer devices they are recorded in digital form, for example in a read-only memory. Each such device includes not only the memory, but also a sound-producing unit, both designed for each specific amusement device. Such sound-producing devices are therefore relatively expensive. Moreover, the sounds produced by each device are limited and usually cannot be conveniently modified.

My above-cited patent application Ser. No. 07/003,040, of which the present application is a division, describes a number of sound-producing amusement or education devices, such as talking books, talking toys, talking dolls, and the like, having advantages in the above respects. The invention of the present application is directed to one such type device, namely to talking books.

SUMMARY OF THE INVENTION OF THE PRESENT APPLICATION

According to the invention of the present application, there is provided an assembly of a talking book and a sound playback unit comprising:

A a book having front and back covers and a plurality of identifiable pages bound between the covers, each page having a printed text thereon which is readable when the book is open to that page;

B a read-only memory attached, preferably to one of the book covers, and provided with a set of terminal connectors, the memory being common to all the pages of the book and having stored therein a plurality of digital recordings of spoken messages each related to the printed text on a respective page of the book; and C a sound playback unit separate and distinct from the book and usable with books of the same type having different printed texts and each having a read-only memory storing digital recordings of the respective text, the unit being provided with a set of input connectors engageable with the terminal connectors of the read-only memory attached to the book to be read, and electronic means connected to the read-only memory through the input connectors to read out the digital recordings and to convert them into sound signals which are reproduced as the spoken messages. The assembly, preferably the sound playback unit, includes selector means to effect selection for readout from the read-only memory the digitized recording related to the printed text on the identifiable page of the book which is then open to a reader.

A number of embodiments of the invention are described below for purposes of example.

According to one described embodiment, the sound playback unit is provided with a pair of jaws adapted to engage the opposing faces of one of the book covers to detachably couple the book to the sound playback unit and to maintain its set of input connectors in engagement with the set of terminal connectors.

The described embodiments also include various arrangements for selecting the digitized recording to be read out by the sound playback unit. Thus, according to one described embodiment, the pages of the book are each identified by a different symbol, and the sound playback unit is provided with selector push buttons which are marked by corresponding symbols, whereby when one of the buttons is pressed, then selected for readout from the read-only memory is the digitized recording related to the printed text on the page carrying the same symbol. According to another described embodiment, the selector means of the sound playback unit is constituted by an array of light-light-sensitive diodes which are selectively covered by page-identifying coded openings formed in the pages of the book. According to a further described embodiment, the selector means comprises a multiple-position digital electrical switch, each position of which corresponds to a respective page of the book.

Such a talking book provides a number of advantages over the conventional constructions. Thus, the read-only memory unit may be specifically designed for the particular book to which it is to be attached, whereas the sound-producing unit may be of a standard design useful with many different talking books or with different kinds of devices (e.g., also with talking toys, talking dolls, etc.). In addition, almost any book can be conveniently, and relatively inexpensively, converted to a talking book by merely attaching a read-only memory unit having recorded therein digital data representing sound recording relating to the pages of the respective book. The sound producing unit, although relatively expensive because it includes most of the components of the talking part of the device, may be used for many different books or other amusement or educational devices; therefore, once the user has purchased a sound producing unit, he can use the same unit for many different devices. Further, the recorded message for the respective amusement device can be easily changed by merely removing the read-only memory unit and attaching another one having the new message recorded therein which new message will be reproduced by the original sound-producing unit.

BRIEF DESCRIPTION OF THE DRAWINGS

The invention is herein described, by way of example only, with reference to the accompanying drawings, wherein.

DESCRIPTION OF PREFERRED EMBODIMENTS

Figure 1:
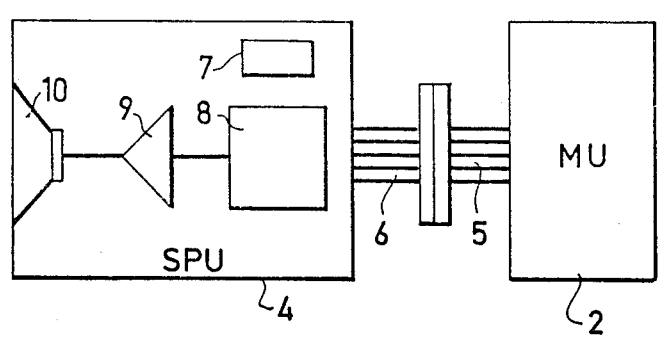
FIG. 1 is a block diagram helpful in explaining the electrical circuit in the talking books described herein.

Reference is first made to the block diagram of FIG. 1 pictorially illustrating the division of the electrical circuit between the read-only memory unit 2 and the sound-producing unit 4. The read-only memory unit 2 is a separate and distinct unit which is fixedly attachable to the books, and includes terminal connectors 5 for connection to the sound-producing unit 4. Similarly, the sound-producing unit 4 is a separate and distinct unit and includes its own input connectors 6 for removably attaching to, and electrically connecting, the sound-producing unit 4 to the read-only memory unit 2.

The read-only memory unit 2 includes only the digital data representing the sounds of the book to which it is attached. On the other hand, the sound-producing unit 4 includes all the other components necessary to reproduce the sounds recorded, including a holder 7 for a battery; circuitry 8, e.g., a central processor unit (CPU), for processing the data; and a transducer 10, e.g., a speaker, for reproducing the sounds recorded in the memory unit 2.

Figure 3:
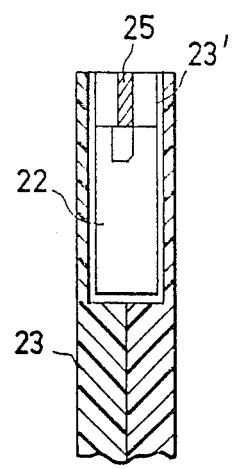
FIG. 3 is a sectional view of a portion of the talking book of FIG. 2 showing one manner of incorporating the read-only memory unit.
Figure 2:
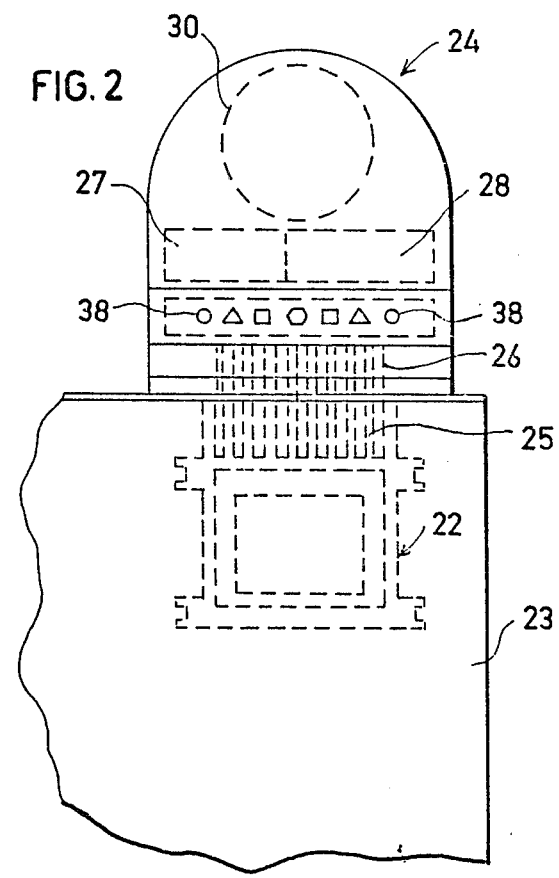
FIG. 2 illustrates one form of talking book constructed in accordance with the present invention.
Figure 4:
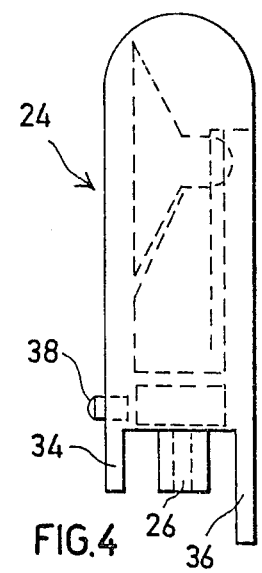
FIG. 4 is a side elevational view illustrating the sound-reproducing unit used in the talking book of FIG. 2.

FIGS. 2-4 illustrate the invention applied to a talking book in which the read-only memory unit 22 is fixedly attached to one of the book covers 23, and a sound-producing unit 24 is mechanically and electrically connectible to the memory unit 22. For this purpose, unit 22 is received within a recess 23' (FIG. 3) formed in the upper edge of the book cover 23, with the terminal connectors 25 of unit 22 exposed for connection to input connectors 26 of the sound-producing unit 24 when the latter is inserted into recess 23'. As described with respect to FIG. 1, the sound-producing unit 24 includes all the components necessary to reproduce the sounds recorded in unit 22, including: a holder 27 for the battery for supplying both units 22 and 24, the processing circuitry 28 for processing the data stored in unit 22, and a speaker 30 for producing the sounds stored in unit 22.

The sound-producing unit 24 further includes a pair of depending stems or jaws 34, 36, (FIG. 4) which are engageable with the opposite faces of the book cover 23 when the unit is inserted into recess 23' of the book cover with connector 26 of unit 24 in electrical contact with connector 25 of unit 22. This arrangement stably supports the sound-producing unit 24 on the upper edge of the book cover.

The sound-producing unit 24 further includes a plurality of pushbuttons 38 of different geometrical configurations. These configurations conform to symbols marked on each page of the book, so that the user may depress the pushbutton having the same configuration as a symbol marked on any particular page in order to select and play back the sound recorded in unit 22 for the respective page.

Figure 5:
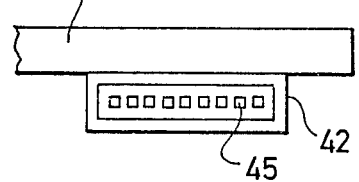
FIG. 5 is a to plan view illustrating another manner of attaching the read-only memory unit to the book.

FIG. 5 illustrates a variation, wherein the read-only memory unit 42 is attached to the outer face of the book cover 43, rather than being received within a recess formed in the book cover. The terminal connectors 45 of unit 42 face upwardly, and as in the previously described embodiment, are exposed for engagement with the input connectors of the sound-producing unit when the latter is attached to the memory unit. The arrangement illustrated in FIG. 5 obviates the need for making any changes in the construction of the book covers, since the memory unit 22 may be conveniently attached to the outer face of any book cover.

Figure 6:
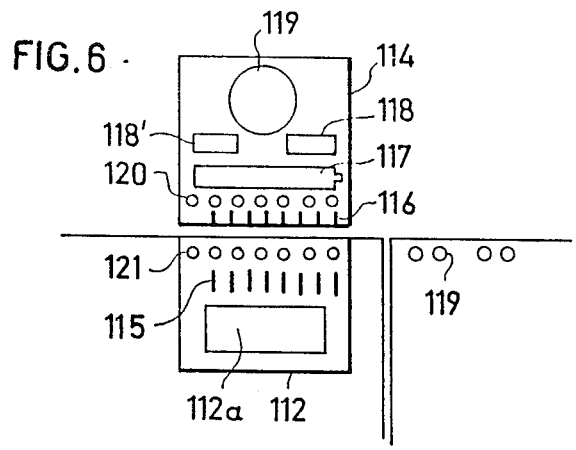
FIG. 6 is a fragmentary view illustrating a talking book including automatic means for selecting the recorded sounds to correspond to a selected one of the book pages.

FIG. 6 illustrates a talking book of the type illustrated in FIGS. 2-5. It includes a read-only memory unit 112 in the form of a board or card mounted, as by fasteners (not shown), to the outer face at the upper end of one of the book covers as illustrated in FIG. 5, so that its terminal connectors 115 are exposed adjacent to its upper edge. The sound-producing unit 114 is removably attachable to the upper edge of the cover with the input connectors 116 of unit 114 in contact with the terminal connectors 115 of unit 112 to establish an electrical connection between the two units. As also in the embodiments illustrated in FIGS. 2-5, unit 112 includes a read-only memory chip 112a having recorded therein the digital data representing spoken words or other sounds corresponding to the contents of the book, and unit 114 includes all the other required components, including a battery holder 117, a CPU 118, an amplifier 118', and a speaker 119, for processing the digital data and for reproducing it in the form of spoken words or other sounds.

However, as distinguished from the embodiments of the invention illustrated in FIGS. 2-5, the embodiment illustrated in FIG. 6 includes means for automatically selecting the recorded data to be reproduced according to the page to which the book is turned. For this purpose, unit 114 is formed with a linear array of light-sensitive diodes 120, and unit 112 is formed with a corresponding linear array of holes 121 alignable with diodes 120. In the described example, there are seven diodes 120 and seven holes 121, thereby enabling them to represent any number from 1 to 7. The illustrated arrangement can therefore be used with a book having up to 7 pages, with a spoken word message recorded in the read-only memory unit 112 for each one of these pages. Each of these different recorded messages is automatically selected by the holes 119 formed in the upper part of each page arranged so that when that page is turned to overlie the light-sensitive diodes 120 of unit 114, the diodes are selectively covered by that page, together with the underlying pages, so as to expose to light that diode representing the page to be read.

Thus, in the arrangement illustrated in FIG. 6, when the user, such as a small child, merely turns to the proper page, the coded arrangement of holes 119 on that page, as well as in the underlying page between it and unit 112, will identify the respective page number and will thereby select the recorded message for that particular page for reproduction by the sound-producing unit 114.

Figure 7:
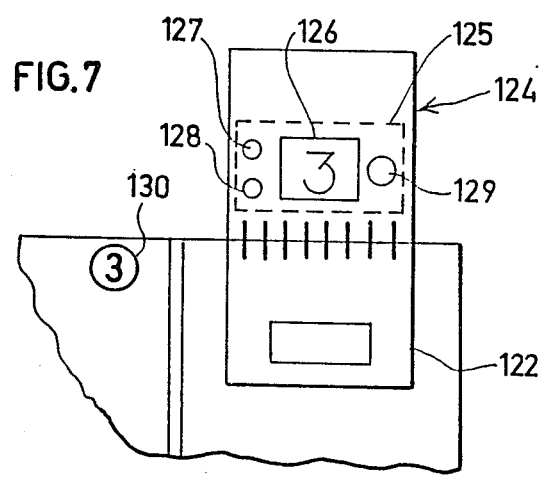
FIG. 7 is also a fragmentary view illustrating a talking book but having other means for selecting the recorded sounds.

FIG. 7 illustrates a talking book of the type illustrated in FIG. 6, but for use by an older child, i.e., one who can recognize the page number and then manually operate the sound-producing unit, therein designated 124, to select the message recorded in the read-only memory unit 122 allocated to that respective page. For this purpose, the sound-producing unit 124 is provided with a multiple-position digital switch 125 including a display 126 for displaying the position of the switch, an up-stepper button 127 for up-stepping the digital switch and its display 126, and a down-stepper button 128 for down-stepping the digital switch and its display. Switch 125 further includes an actuator button 129 which is to be depressed after the switch has been incremented to its proper position to correspond to the number 130 printed on the respective page of the book.

Thus, in the arrangement illustrated in FIG. 7, the memory unit 122 may include digital data representing a message for each of the pages of the book. These messages can be manually selected by the user by merely incrementing switch 125 until its display 126 matches the number or symbol for the respective page, and then depressing actuator button 129.

The talking books illustrated could be modified so that the sounds recorded in the memory unit are automatically reproduced page after page, starting from the first page, unless or until the user intervenes. The arrangement illustrated in FIG. 7 could be modified to omit the actuator button 129, such that the reproduction of the sounds is automatically effected after the elapse of a predetermined time interval following the selection of the page.

In all the described embodiments, the memory unit is described as a read-only memory unit (ROM), but it will be appreciated this includes the variations of such units, namely PROM's, EPROM's, EEPROM's etc. Also, while the memory unit is preferably attached to one of the covers, obviously it could be attached to the book spine.

Many other variations, modifications and applications of the invention will be apparent.

What is claimed is:

1. An assembly of a talking book and a sound playback unit comprising:
   a book having front and back covers and a plurality of identifiable pages bound between the covers, each page having a printed text thereon which is readable when the book is open to that page;
   a read-only memory attached to the book and provided with a set of terminal connectors, said memory being common to all the pages of the book and having stored therein a plurality of digital recordings of spoken messages each related to the printed text on a respective page of the book; and
   a sound playback unit separate and distinct from the book and usable with books of the same type having different printed texts and each having a read-only memory storing digital recordings of the respective text, said sound playback unit being provided with a set of input connectors engageable with the terminal connectors of the read-only memory attached to the book to be read, and electronic means connected to the read-only memory through the input connectors to read out the digital recordings and to convert them into sound signals which are reproduced as the spoken messages;
   said assembly further including selector means to effect selection for readout from the read-only memory the digitized recording related to the printed text on the identifiable page of the book which is then open to a reader.

2. An assembly as set forth in claim 1, wherein said sound playback unit is provided with a pair of jaws adapted to engage the opposing faces of one of the book covers to detachably couple the sound playback unit to the book and to maintain said set of input connectors of the sound playback unit in engagement with the set of terminal connectors of the read-only memory.

3. An assembly as set forth in claim 1, wherein said pages of the book are each identified by a different symbol, and said selector means is on the sound playback unit and comprises a plurality of selector push buttons which are marked by corresponding symbols, whereby when one of said buttons is pressed, the digitized recording related to the printed text on the page carrying the same symbol is then selected for readout from the read-only memory.

4. An assembly as set forth in claim 1, wherein said set of terminal connectors are exposed adjacent an edge of one of the covers to which the read-only memory is attached.

5. An assembly as set forth in claim 1, wherein said electronic means includes a central processing unit to convert the digital recordings that are read out of the memory into sound signals, an amplifier for the sound signals, and a loudspeaker coupled to the output of the amplifier to reproduce the spoken message.

6. An assembly as set forth in claim 1, wherein said selector means comprises an array of light-sensitive diodes on said sound playback unit which diodes are selectively covered by page-identifying coded openings formed in the pages of the book.

7. An assembly as set forth in claim 1, wherein said selector means comprises a multiple-position digital electrical switch on said sound playback unit, each position of which corresponds to a respective page of the book.

8. An assembly of a talking book and a sound playback unit comprising:
   a book having front and back covers and a plurality of identifiable pages bound between the covers, each page having a printed text thereon which is readable when the book is open to that page;
   a read-only memory attached to one of the book covers and provided with a set of terminal connectors, said memory being common to all the pages of the book and having stored therein a plurality of digital recordings of spoken messages each related to the printed text on a respective page of the book; and
   a sound playback unit separate and distinct from the book and usable with books of the same type having different printed texts and each having a read-only memory storing digital recordings of the respective text, said sound playback unit being provided with a set of input connectors engageable with the terminal connectors of the read-only memory attached to the book to be read, and electronic means connected to the read-only memory through the input connects to read out the digital recordings and to convert them into sound signals which are reproduced as the spoken messages; said sound playback unit including selector means to effect selection for readout from the read-only memory of the digitized recording related to the printed text on the identifiable page of the book which is then open to a reader.

9. An assembly as set forth in claim 8, wherein said electronic means includes a central processing unit to convert the digital recordings that are reasd out of the memory into sound signals, an amplifier for the sound signals, and a loudspeaker coupled to the output of the amplifier to reproduce the spoken message.

10. An assembly as set forth in claim 8, wherein said set of terminal connectors are exposed adjacent an edge of the cover to which the read-only memory is attached.

11. An assembly as set forth in claim 8, wherein said sound playback unit is provided with a pair of jaws adapted to engage the opposing faces of the book covers to detachably couple the book to the sound playback unit and to maintain its set of input connectors in engagement with the set of terminal connectors.

12. An assembly as set forth in claim 8, wherein said pages of the book are each identified by a different symbol, and said selector means on the sound playback unit comprises a plurality of selector push buttons which are marked by corresponding symbols, whereby when one of said buttons is pressed, the digitized recording related to the printed text on the page carrying the same symbol is then selected for readout from the read-only memory.

13. An assembly as set forth in claim 8, wherein the selector means of the sound playback unit comprises an array of light-sensitive diodes which are selectively covered by page-identifying coded openings formed in the pages of the book.

14. An assembly as set forth in claim 8, wherein said selector means comprises a multiple-position digital electrical switch, each position of which corresponds to a respective page of the book.

15. An assembly of a talking book and a sound playback unit comprising:
   a book having front and back covers and a plurality of identifiable pages bound between the covers, each page having a printed text thereon which is readable when the book is open to that page;
   a read-only memory attached to one of the book covers and provided with a set of terminal connectors, said memory being common to all the pages of the book and having stored therein a plurality of digital recordings of spoken messages each related to the printed text on a respective page of the book; and
   a sound playback unit separate and distinct from the book and usable with books of the same type having different printed texts and each having a read-only memory storing digital recordings of the respective text, said sound playback unit being provided with a set of input connectors engageable with the terminal connectors of the read-only memory attached to the book to be read, and electronic means connected to the read-only memory through the input connectors to read out the digital recordings and to convert them into sound signals which are reproduced as the spoken messages; said electronic means including a central processing unit to convert the digital recordings that are read out of the memory into sound signals, an amplifier for the sound signals and a loudspeaker coupled to the output of the amplifier to reproduce the spoken message; said sound playback unit further including a power supply and selector means to effect selection for readout from the read-only memory the digitized recording related to the printed text on the identifiable page of the book which is then open to a reader.

16. An assembly as set forth in claim 15, wherein said sound playback unit is provided with a pair of jaws adapted to engage the opposing faces of the book cover to detachably couple the book to the sound playback unit and to maintain its set of input connectors in engagement with the set of terminal connectors.

17. An assembly as set forth in claim 15, wherein said pages of the book are each identified by a different symbol, and said selector means on the sound playback unit comprises a plurality of selector push buttons which are marked by corresponding symbols, whereby when one of said buttons is pressed, then selected for readout from the read-only memory is the digitized recording related to the printed text on the page carrying the same symbol.

18. An assembly as set forth in claim 15, wherein said set of terminal connectors are exposed adjacent an edge of the cover to which the read-only memory is attached.

19. An assembly as set forth in claim 15, wherein the selector means of the sound playback unit comprises an array of light-sensitive diodes which are selectively covered by page-identifying coded openings formed on the pages of the book.

20. An assembly as set forth in claim 15, wherein said selector means comprises a multiple-position digital electrical switch, each position of which corresponds to a respective page of the book.

* * * * *